US008911582B2

(12) United States Patent
Stensvad et al.

(10) Patent No.: US 8,911,582 B2
(45) Date of Patent: Dec. 16, 2014

(54) METHOD AND APPARATUS FOR APPLYING A STAMP FOR MICRO-CONTACT PRINTING TO A STAMPING ROLL

(75) Inventors: Karl K. Stensvad, Inver Grove Heights, MN (US); Jonathan J. O'Hare, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/241,452

(22) PCT Filed: Sep. 14, 2012

(86) PCT No.: PCT/US2012/055352
§ 371 (c)(1), (2), (4) Date: Feb. 27, 2014

(87) PCT Pub. No.: WO2013/040319
PCT Pub. Date: Mar. 21, 2013

(65) Prior Publication Data

US 2014/0202612 A1 Jul. 24, 2014

Related U.S. Application Data

(60) Provisional application No. 61/535,407, filed on Sep. 16, 2011.

(51) Int. Cl.

| | |
|---|---|
| ***B32B 37/02*** | (2006.01) |
| ***B32B 37/10*** | (2006.01) |
| ***B32B 38/06*** | (2006.01) |
| ***B32B 38/14*** | (2006.01) |
| ***B65C 9/04*** | (2006.01) |
| ***B41F 7/20*** | (2006.01) |
| ***B41F 33/00*** | (2006.01) |
| ***B41F 17/00*** | (2006.01) |

(52) U.S. Cl.
CPC . *B41F 7/20* (2013.01); *B41F 33/00* (2013.01); *B41F 17/00* (2013.01)
USPC ............................ 156/242; 156/448; 156/449

(58) Field of Classification Search
CPC ............ B41F 17/00; B41F 33/00; B41F 7/20; B65C 3/10; B65C 3/02; B65C 3/105; B29K 2021/00
USPC .................................. 156/242, 245, 448, 449
See application file for complete search history.

(56) References Cited

U.S. PATENT DOCUMENTS

| | | | |
|---|---|---|---|
| 5,313,332 | A | 5/1994 | Schell |
| 7,990,628 | B1 | 8/2011 | Calvet |

FOREIGN PATENT DOCUMENTS

| | | |
|---|---|---|
| GB | 2 441 339 | 3/2008 |
| JP | 07017046 | 3/1995 |

(Continued)

OTHER PUBLICATIONS

Bal-tec, "Flexures," printed Jun. 25, 2011, 29 pages, http://www.precisionballs.com/Flexures.html.

(Continued)

*Primary Examiner* — Sonya Mazumdar
(74) *Attorney, Agent, or Firm* — Adrian L. Pishko

(57) ABSTRACT

An apparatus to facilitate the application of a micro-contact printing stamp to a roll. The apparatus preferentially constrains some of the stamp's six degrees of freedom, and then drives the stamp (or the assembly of the stamp and the master against which it was formed) into controlled contact with the printing roll so as to attach the stamp onto the outer surface of the roll.

21 Claims, 4 Drawing Sheets

(56) References Cited

FOREIGN PATENT DOCUMENTS

| | | |
|---|---|---|
| JP | 2000-289320 | 10/2000 |
| JP | 2011-073269 | 4/2001 |
| JP | 2005-066959 | 3/2005 |
| JP | 2009-119787 | 6/2009 |
| JP | 2009119787 A * | 6/2009 |
| WO | WO 2013/003253 | 1/2013 |
| WO | WO 2013/003412 | 1/2013 |

OTHER PUBLICATIONS

PCT International Search Report, PCT/US2012/055352, 3 pages.

* cited by examiner

METHOD AND APPARATUS FOR APPLYING A STAMP FOR MICRO-CONTACT PRINTING TO A STAMPING ROLL

CROSS REFERENCE TO RELATED APPLICATIONS

This application is a national stage filing under 35 U.S.C. 371 of PCT/US2012/055352, filed Sep. 14, 2012, which claims priority to Provisional Application No. 61/535,407, filed Sep. 16, 2011, the disclosure of which is incorporated by reference in its/their entirety herein.

BACKGROUND

It is known to employ micro-contact printing to produce metalized patterns on a substrate. One of the unique characteristics of products created from micro-contact printing are the intricate patterns the process is capable of generating. Specifically, continuous intersecting line patterns with line widths smaller than 10 microns having the advantage of high optical transmission (clear films appear transparent when used as a touch screen) and relatively high electrical conductivity can be prepared over a large area. This small feature size width, along with the low overall density of lines, is created by very fine patterning with the micro-contact printing stamp.

The present invention is related to the mounting of stamps used in micro-contact printing onto a receiving surface, and more particularly to the mounting of stamps onto a roll.

SUMMARY

Micro-contact printing is a process of patterning metal traces by printing a monolayer of etch-resistant, self-assembling molecules, and etching the metal in areas outside of the printed monolayer. One of the elements of micro-contact printing is a flexible, conformable stamp, usually made out of polydimethylsiloxane (PDMS) that has micron-scale patterned lines that are used to print the monolayer.

Micro-contact printing stamps are typically made by first making a master, usually by a lithographic process, pouring PDMS on that master, and curing the PDMS. The micro-contact printing stamp must then be removed from the master and applied to a printing tool, which is often a planar support surface. However, it is possible to adhere the micro-contact printing stamp to a printing roll for rotary printing. For example, the micro-contact printing stamp can be removed from the mold and placed into contact with the printing roll. The printing roll can be rotated to apply the micro-contact printing stamp to the roll while using an adhesive layer to secure it. Even when carefully done, this step can introduce distortions into the final printed pattern. These distortions then become locked into the micro-contact stamp by the adhesive layer reducing the fidelity of the replicated pattern from that designed for the master. The printing of micro-contact patterns would be advanced by a way to apply micro-contact printing stamps to printing rolls in a controlled and repeatable way.

It has now been determined that an apparatus can be used to facilitate the application of a micro-contact printing stamp to a roll. The inventive apparatus preferentially constrains some of the stamp's six degrees of freedom, and then drives the stamp (or the assembly of the stamp and the master against which it is still molded) into controlled contact with the printing tool (e.g. printing roll) so as to adhere the stamp to the roll.

In one embodiment, the invention provides an apparatus for applying a micro-contact printing stamp to a roll, the apparatus comprising: an upper platen supporting the micro-contact printing stamp, a lower support, and a plurality of flexures connecting the upper platen to the lower support, an X-axis, a Y-axis, and a Z-axis passing though a centroid of the upper platen with the X-axis and the Z-axis located within the plane of the upper platen and the Z-axis parallel to a rotation axis of the roll; an elevating member to translate the upper platen along the Y-axis with respect to the lower support to contact the micro-contact printing stamp with an outer diameter of the roll; and at least one linear motion member located between the lower support and a base allowing translation of the lower support along the X-axis when transferring the micro-contact printing stamp from the upper platen to the roll.

In another embodiment, the invention provides a method of applying a micro-contact printing stamp to a roll comprising: supporting the micro-contact printing stamp on an upper platen having an X-axis, a Y-axis, and a Z-axis passing though a centroid of the upper platen with the X-axis and the Z-axis located within the plane of the upper platen and the Z-axis parallel to a rotation axis of the roll; allowing translation of the upper platen along the Y-axis, rotation of the upper platen about the X-axis, and translation of the lower support along the X-axis; providing stiffness ratios, resulting from the physical coupling chosen between the upper platen and the lower support, such that $kX/kY$ and $kZ/kY$ are both greater than 3 and $k\Phi Z/k\Phi X$ and $k\Phi Y/k\Phi X$ are both greater than 3; elevating the upper platen along the Y-axis to touch the micro-contact printing stamp to the roll; and rotating the roll while translating the lower support along the X-axis to transfer the micro-contact printing stamp to the roll.

In another embodiment, active stiffness control using position or force feedback c utilized to control the motion of the upper platen. Hence in one embodiment, the invention resides in a method of applying a micro-contact printing stamp to a roll comprising: supporting the micro-contact printing stamp on an upper platen having an X-axis, a Y-axis, and a Z-axis passing though a centroid of the upper platen with the X-axis and the Z-axis located within the plane of the upper platen and the Z-axis parallel to a rotation axis of the roll; allowing translation of the upper platen along the Y-axis, rotation of the upper platen about the X-axis, and translation of the lower support along the X-axis; providing motion control, resulting from the physical coupling and mechanical actuators chosen connecting the upper platen to the lower support; wherein the upper platen is controlled by at least one of the group consisting of translation along the X-axis using position feedback, translation along the Y-axis using force feedback, translation along the Z-axis using position feedback, rotation about the X-axis using force feedback, rotation about the Y-axis using position feedback, and rotation about the Z-axis using position feedback; elevating the upper platen along the Y-axis to touch the micro-contact printing stamp to the roll; and rotating the roll while translating the lower support along the X-axis to transfer the micro-contact printing stamp to the roll.

As used herein, a micro-contact printing stamp is a member having raised features receptive to a printing ink, such as a thiol solution, with at least one dimension of the contacting surface of the raised feature having a width less than 20, 10, or 5 microns. In many embodiments, a micro-contact printing stamp has a plurality of raised lines for printing electrical circuit patterns and the width of the raised lines and resulting printed traces is less than 20, 10, or 5 microns.

As used herein upper, lower, left, right, and other relative directional terms are used for the convenience of the reader and do not imply this specific orientation or position is required by the apparatus in use.

BRIEF DESCRIPTION OF THE DRAWINGS

In describing the embodiments of the invention, reference is made to the various Figures in which the features of the depicted embodiments are identified with reference numeral with like reference numerals indicating like structures and wherein.

DETAILED DESCRIPTION

Figure 1:
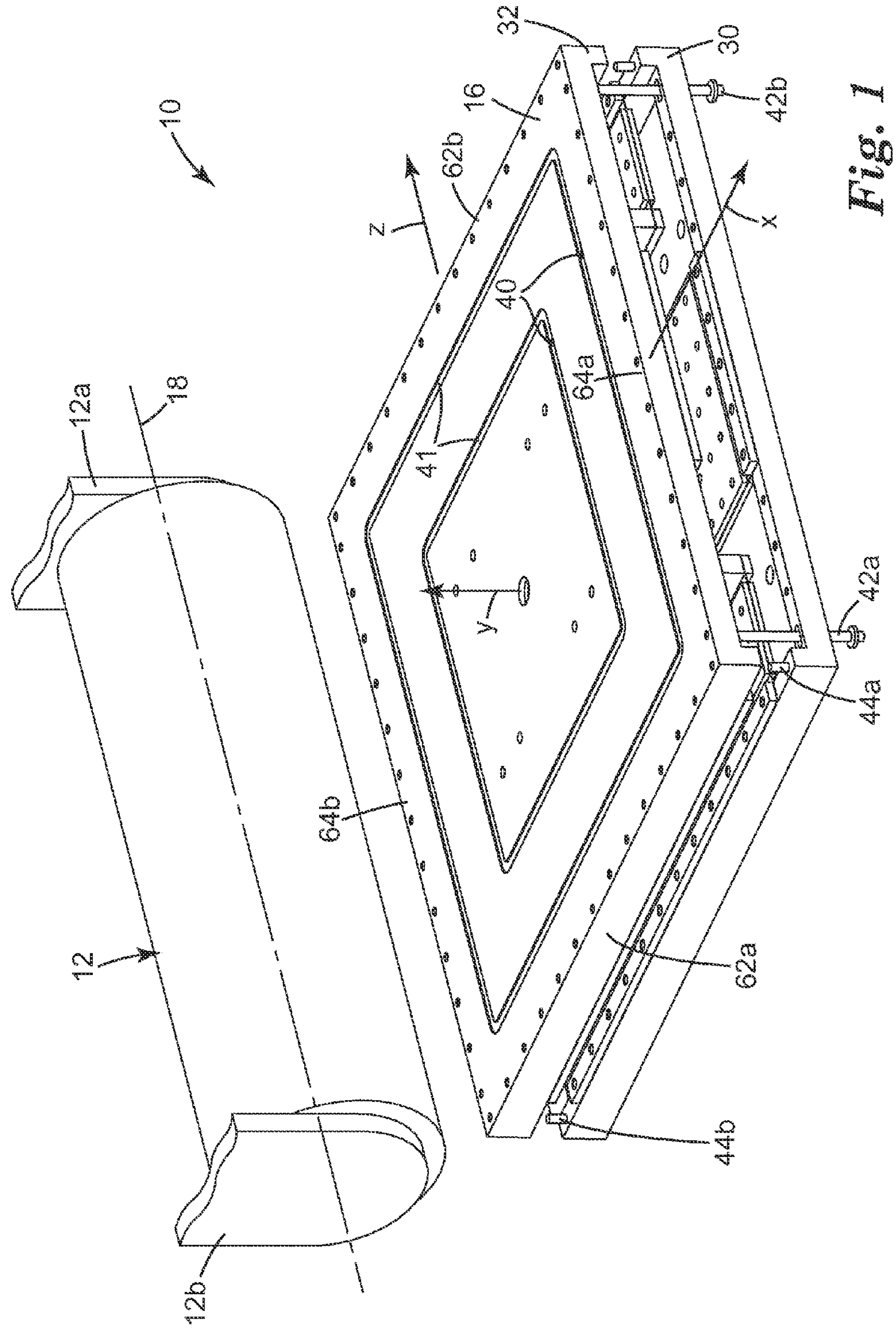
FIG. 1 is a perspective view of part of an apparatus according to the present invention adjacent to a printing roll set to receive a micro-contact printing stamp from the apparatus.
Figure 3:
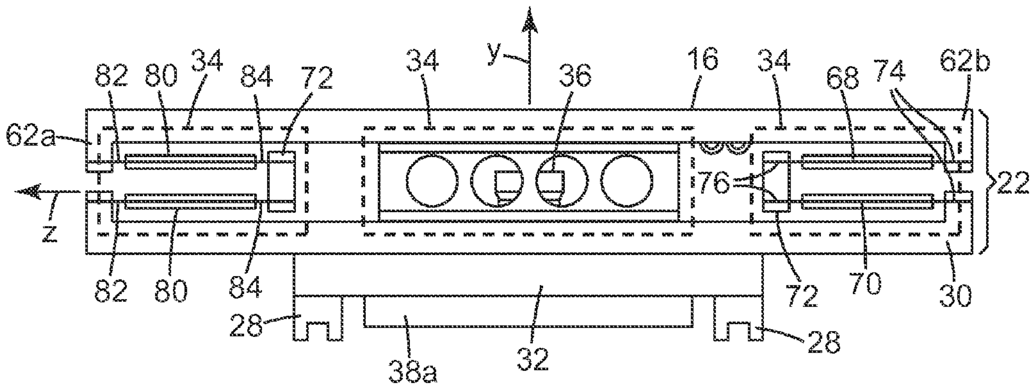
FIG. 3 is an end view of a portion of the apparatus depicted in FIG. 1.
Figure 4:
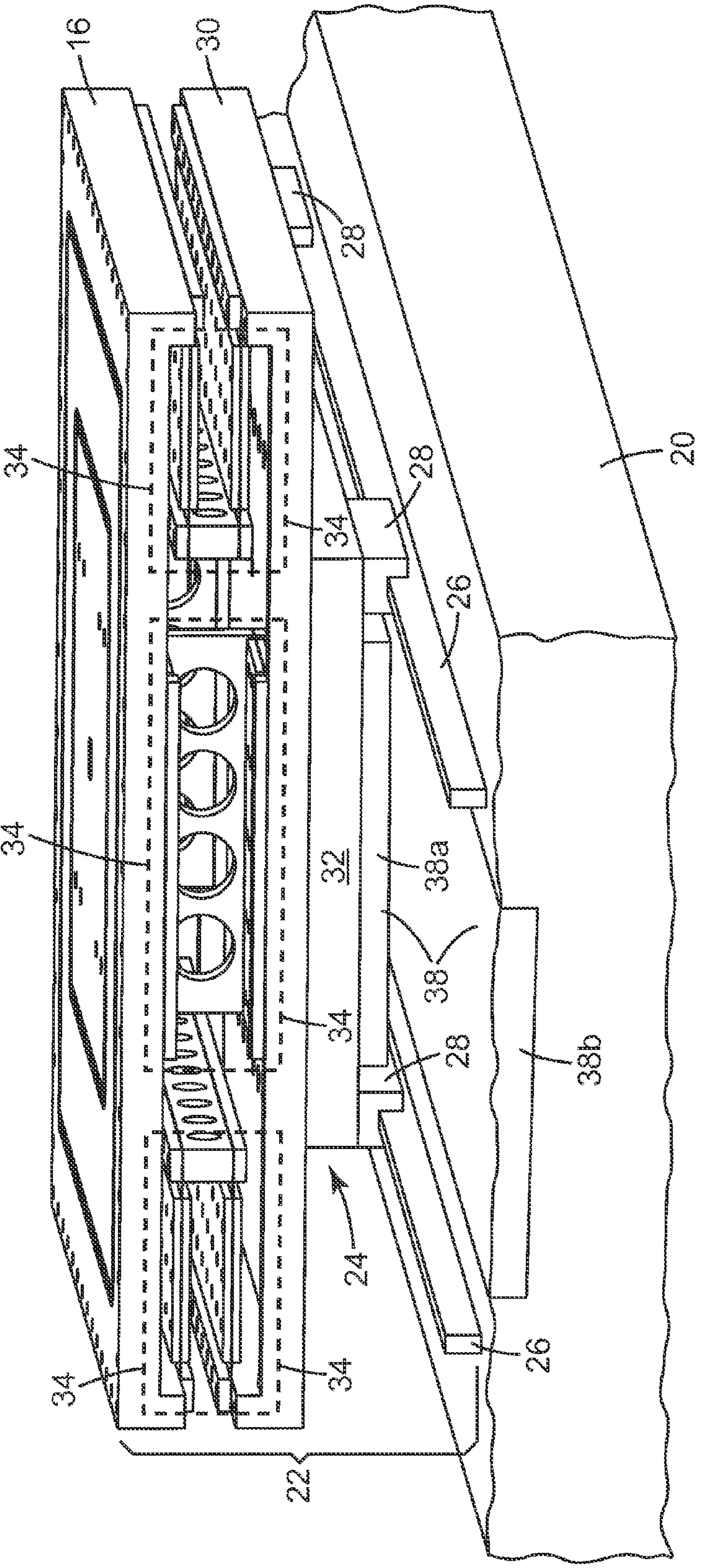
FIG. 4 is a perspective view of an apparatus for applying a micro-contact printing stamp to a printing roll.

Referring now to FIGS. 1, 3, and 4, an apparatus 10 is illustrated adjacent to a printing roll 12. The printing roll 12 is disposed within mounts 12*a* and 12*b*, and is free to rotate about the roll's rotation axis 18. The printing roll could be a dead shaft roll, a live shaft roll, or a round sleeve supported by an air bearing as disclosed in co-pending patent application Ser. No. 61/503,204 entitled "Apparatus and Method for Micro-contact Printing on Indefinite Length Webs", filed on Jun. 30, 2011.

Figure 2:
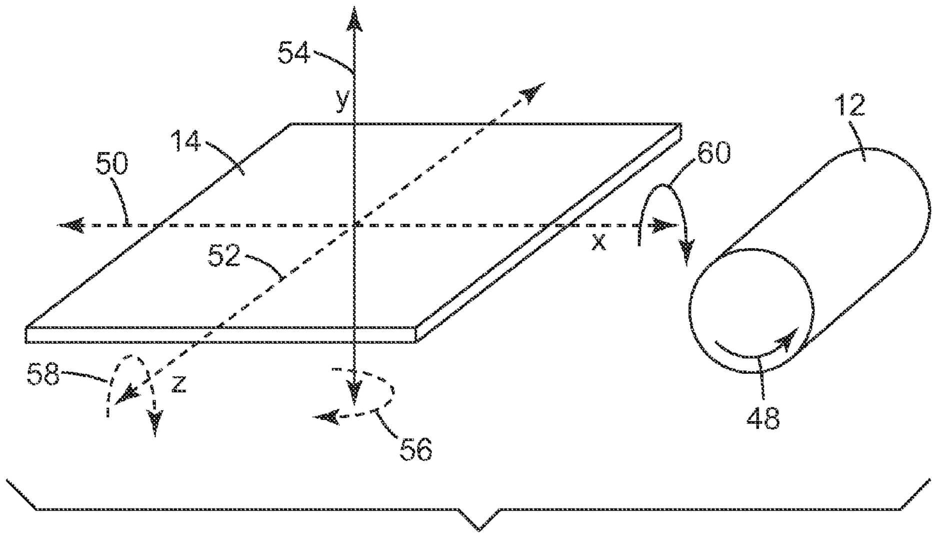
FIG. 2 is a schematic view of the allowed and constrained motions of the micro-contact printing stamp relative to the lower platen of the apparatus.

The roll 12 stands ready to receive a micro-contact printing stamp 14 as shown in FIG. 2. The micro-contact printing stamp is supported by an upper platen 16 prior to application to the roll. The upper platen can have any shape or size required to support the micro-contact printing stamp on its surface. In many embodiments, the upper platen will be generally square or rectangular with a substantially planar supporting surface for the micro-contact printing stamp. For discussion purposes, an X, Y, Z Cartesian coordinate system is located with its origin at the centroid (geometric center) of the upper platen 16 such that the X-axis and the Z-axis are located within the plane defined by the upper platen 16 and with the Z-axis parallel to the rotation axis 18 of the roll.

The apparatus 10 further includes a base 20 supporting a carriage 22, with the carriage 22 capable of translational motion along the X-axis (machine direction). The carriage 22 is connected to the base 20 by at least one linear motion member located between a lower support 24 for the upper platen 16 and the base 20. Various linear motion members known to those of skill in the art such low friction or aerostatic bushings on round rails or linear bearings on profiled rails can be used. The lower support 24 can be a rectangular frame, a lower platen, or other supporting structure for supporting the upper platen 16.

In one specific embodiment, two linear rails 26 are mounted on the base 20 with each rail parallel to the X-axis and a plurality of linear bearings 28 are attached to the lower support 24 and positioned on the rails 26. For example, the lower support 24 can comprise a lower platen 30 and a spacer plate 32. A linear bearing 28 is attached to each corner of the rectangular spacer plate 32. The spacer plate 32 can be used to change the starting height of the micro-contact printing stamp 14 along the Y-axis relative to the printing roll 12 to accommodate for changes in the roll's diameter and/or the stamp's overall thickness.

The carriage 22 in one embodiment can comprise the upper platen 16, a plurality of flexures 34 or flexure assemblies connecting the upper platen 16 to the lower support 24 comprising the lower platen 30, the spacer block 32 and the plurality of linear bearings 28. The plurality of flexures 34, as will be discussed in more detail later, stiffen certain motions of the upper platen with respect to the lower support 24, while still allowing translation of the upper platen 16 along the Y-axis and rotation of the upper platen about the X-axis. An elevating member 36 (FIG. 3) is provided for translating the upper platen 16 from the resting position depicted in the figures along the Y-axis to touch the upper surface of the micro-contact printing stamp with the roll's outer diameter with a predetermined force. In many convenient embodiments, the elevating member will be a low friction pneumatic cylinder supplied with an adjustable air pressure, but other mechanical expedients (such as constant force springs), or electromechanical expedients (such a linear actuators) can be used. For example, closed loop force control actuators could be used. In general, the elevating member will be adjusted such that the micro-contact printing stamp touches the roll 12 with a nip load of 0.1-5 pli, or 1.0-1.5 pli as it is applied. Too low of a nip load can provide unreliable adhesion and too high of a nip load can introduce distortions into the stamp during application.

A linear motion actuator such as a lead screw, linear motor, or hydraulic cylinder can be provided for controlling the X-direction translation of the carriage 22 relative to the base 20. Alternatively, it is possible to use the rotation of the printing roll 12, either rotated manually by hand or automatically via a drive connected to the roll, to translate the carriage while applying the stamp to the roll since the stamp is in surface contact with the roll. In one embodiment, a linear servo motor 38 is used with the armature 38*a* of the servo motor attached to the bottom of the spacer plate 32 and the stator 38*b* of the servo motor attached to the base 20. A servo motor controller is utilized to control the displacement and speed of the carriage 22 as it translates along the rails 26. In certain embodiments, the carriage 22 can be translated at velocity of 0.5 to 9 mm/s, such as 1 mm/s, and the roll can be allowed to rotate freely as it is driven by surface contact with the micro-contact printing stamp during transfer of the stamp to the roll. In other embodiments, the roll can be driven and passively translate the carriage, or both elements can be actively driven and speed matched to a pre-determined velocity.

The upper platen 16 can further comprise one or more holes 40 and/or one or more grooves 41 in the planar support surface of the upper platen connected to a source of vacuum creating a vacuum chuck for selectively holding or releasing the stamp 14 or the assembly of the stamp 14 still residing in the mold used to form it. In some embodiments as disclosed in co-pending patent application Ser. No. 61/503,220 entitled "Method for Making, Inking, and Mounting Stamps for Micro-contact Printing", filed on Jun. 30, 2011, the micro-contact printing stamp is supported in a master or sub-master during application to the roll 12.

As will be described with more particularity below, relative to the lower platen 30, the upper platen 16 is stiffly constrained in some ways, and freer to move in other ways. Relative to the lower platen 30, the upper platen 16 is stiffly constrained from translation along the X-axis and Z-axis, stiffly constrained from rotation about the Y-axis, stiffly constrained from rotation about the Z-axis, relatively free to rotate about the X-axis, and relatively free to translate along the Y-axis. The allowed and constrained motions result from the choice and arrangement of the flexures joining the upper platen 16 to the lower platen 30.

Translational stiffness is defined as the ratio of the applied force along an axis divided by the linear displacement along that same axis. Translational stiffness can be expressed in Newton's per meter or pound force per inch. For example, kX (stiffness along the X-axis) is equal to the force applied along the X-axis divided by the displacement of the upper platen along the X-axis. Similarly, kY and kZ are determined by the ratio of the applied force to the translation along the respective axes. Rotational stiffness is defined as the ratio of the applied moment about an axis divided by the angular rotation about that same axis. Rotational stiffness can be expressed as Newton-meters per radian or inch-pounds per degree. For example, kΦX (rotational stiffness about the X-axis) is equal to the applied moment about the X-axis divided by the angular rotation of the upper platen about the X-axis. Similarly, kΦY and kΦZ are determined by the ratio of the applied moment to the rotation about the respective axes.

An axis that is "stiffly constrained" is stiffer than a comparable "free" axis. A stiffness ratio can be defined as the ratio of the stiffness of the "stiffly constrained" axis (translation or rotation) divided by the stiffness of the "free" axis (translation or rotation). For example kX/kY is a stiffness ratio between the stiffly constrained X-axis translation and the allowable motion along the Y-axis. Similarly, kΦZ/kΦX is a stiffness ratio between the stiffly constrained rotation about the Z-axis and allowable rotation about the X axis.

In some embodiments, the stiffness ratios can be infinity for the stiffly constrained translations or rotations divided by the free translations or rotations. For example, extremely low friction devices such as air bearings can have a stiffness value near zero or even zero. In these embodiments, division by zero will be assigned to a value of infinity and the resulting infinity value will be deemed to be greater than 3, 6, 10, 100, 1000, or 10,000. In some embodiments of the invention kX/kY or kZ/kY are greater than 3, 6, 10, 100, 1000, or 10,000 and kΦZ/kΦX or kΦY/kΦX are greater than 3, 6, 10, 100, 1000, or 10,000. In some embodiments of the invention kX/kY and kZ/kY are both less than 100,000; 1,000,000; or 1,000,000,000 and kΦZ/kΦX and kΦY/kΦX are both less than 100,000; 1,000,000; or 1,000,000,000. Ranges for any of the stiffness ratios are within the scope of the invention by selecting any of the above values to create one. For example, kZ/kY can be from 10 to 100,000. Stiffness values and stiffness ratios can be readily calculated by finite element analysis techniques employed by computer modeling software. One suitable program is ANSYS available from ANSYS, Inc. Canonsburg, Pa.

In the apparatus, the free motions are not completely without stops. Adjustable translation stops 42*a* and 42*b* near each corner of the upper and lower platens comprising a pin (threaded rod attached to the upper platen) and an adjustable flange (washer and nut), and analogous features on the far side of the apparatus 10 limit the maximum travel of the upper platen along the Y-axis while still allowing for rotation of the upper platen about the X-axis since the lower platen is slotted in the Z-direction where the pin passes through it. Adjustable rotation stops 44*a* and 44*b* near each corner of the upper and lower platens comprising a pin (threaded rod attached to the lower platen) and analogous features on the far side of apparatus 10 provide a maximum limit on the rotation of the upper platen 16 around the X-axis.

In use, the free motions have a valuable function. The freedom of the upper platen 16 to rotate about the X-axis maintains a consistent line of contact (force) between the stamp 14 and the roll 12 as the carriage 22 is translated along the X-axis underneath the roll 12 while applying the stamp to the roll. Freedom of the upper platen 16 to translate along the Y-axis without undo friction is desired to maintain and achieve a predetermined lamination nip pressure (force applied to the stamp) between the upper surface of the stamp and the outer diameter of the roll.

Referring now to FIG. 2, a schematic view of the allowed and constrained motions of the stamp 14 relative to the lower platen 30 of the apparatus 10 is illustrated. The allowed "free" motions are in solid lines, the constrained "stiff" motions in phantom lines. More specifically, translational motion of the stamp 14 along the X-axis beneath the roll 12 is permitted between the carriage 22 and the support base 20 (shown in FIG. 4) so that the stamp 14 can make laminating contact against the roll 12. But translational motion of the stamp 14 in the X-direction (motion line 50) relative to the upper and lower platens is not permitted. The vacuum chuck constrains the stamp 14 relative to the upper platen 16 and the upper platen is stiffly constrained against X-direction motion relative to the lower platen 30. Similarly, translational motion of the stamp 14 in the Z-direction (motion line 52) is stiffly constrained relative to the upper and lower platens. The vacuum chuck constrains the stamp 14 relative to the upper platen 16 and the upper platen is stiffly constrained against Z-direction motion relative to the lower platen 30. However, translational motion in the Y-direction (motion line 54) is permitted, and is needed to maintain and achieve a predetermined lamination pressure of the stamp against roll 12. Rotational movement of the upper platen 16 about the Y-axis (motion line 56) and rotational movement about the Z-axis (motion line 58) are both stiffly constrained relative to X-axis rotation. However rotational movement about the X-axis (motion line 60) is permitted, and is desired to maintain a constant contact line between the stamp 14 and the roll 12 as the carriage 22 is translated along the X-axis underneath the roll 12.

While various mechanical connections between the upper platen 16 and the lower support can be used to provide the desired degrees of freedom and stiffness ratios to the upper platen 16 relative to the lower platen, one choice is to utilize a flexure comprising a thin rectangular plate. A plurality of flexures 34 can be used to connect the upper platen to the lower support to achieve the desired motions.

In one embodiment, the upper platen 16 can be attached to a lower support such as an outer rectangular frame surrounding the upper platen or an inner lower support block by four flexures forming a generally rectangular configuration. By generally rectangular it is meant that four individual lines, with a single line drawn tangent to the end of each flexure that is attached to the upper platen, would intersect in four vertices forming a square, rectangle, or parallelogram even though the flexures themselves may not touch, cross, or intersect at the corners. Two flexures are arranged with one end attached to the upper platen parallel to the X-axis forming side flexures with one flexure attached to either side (62*a* and 62*b*) of the upper platen 16. Two flexures are arranged with one end attached to the upper platen parallel to the Z-axis forming end flexures with one flexure attached to either end (64*a* and 64*b*) of the upper platen. To reduce rotational stiffness about the X-axis, both side flexures are longer than each of the end flexures. Such an embodiment could be constructed by removing the lower platen in FIG. 4, removing the lower flexures of each pair of flexures, and attaching the upper flexures to the spacer block 32. Single flexures along only the sides and the ends of the upper platen 16 have limited Y-axis translation and X-axis rotation and can undergo undesirable strain stiffening for larger displacements and larger rotations.

To provide more Y-axis translation four flexure assemblies 34 forming a generally rectangular configuration can be used. By generally rectangular it is meant that four individual lines, with a single line drawn tangent to the end of each upper flexure 68 that is attached to the upper platen, would intersect in four vertices forming a square, rectangle, or parallelogram even though the upper flexures themselves may not touch, cross, or intersect at the corners. Each flexure assembly has an upper flexure 68, a lower flexure 70, and a floating interconnecting member 72; a first end 74 of each upper flexure attached to the upper platen 16 and a second end 76 of each upper flexure attached to one of the floating interconnecting members 72, a first end 74 of each lower flexure 70 attached to the lower support and a second end 76 of each lower flexure attached to one of the floating interconnecting members 72. Two flexures assemblies 66 are arranged with the first end 74 of each upper flexure 68 parallel to the X-axis forming side flexures assemblies with one flexure assembly attached to either side (62*a* and 62*b*) of the upper platen 16. Two flexures assemblies are arranged with the first end 74 of each upper flexure 68 parallel to the Z-axis forming end flexures assemblies with one flexure assembly attached to either end (64*a* and 64*b*) of the upper platen 16. To reduce rotational stiffness about the X-axis, the side flexures assemblies parallel to the X-axis are longer than each of the end flexure assemblies parallel to the Z-axis. As seen, prior to elevating the stamp to contact the roll, each upper flexure 68 is substantially parallel (within +/5 degrees) to each lower flexure 70. This is not necessary, but provides symmetrical motion before strain stiffening occurs as the assembly reaches its maximum displacement when raising or lowering the upper platen.

To further stiffen the structure, each flexure assembly 66 can comprises one or more stiffening plates 80 attached selectively to any or all of the flexures. The chosen plates may have different thicknesses or be made from different materials depending on the relative amount of stiffening desired. For example, a pair of stiffening plates 80 located on opposite sides of each upper flexure 68 and a pair of stiffening plates 80 located on opposite sides of each lower flexure 70 leaving a first gap 82 between the upper platen and the stiffening plates and a second gap 84 between the floating interconnecting member 72 and the stiffening plates. There are also corresponding first gaps 82 for the lower flexures 70 to the lower platen 30 and second gaps 84 for the lower flexures to the floating interconnecting member. In general, reducing the gaps will stiffen the structure but too small of a gap can be unduly restrictive especially for rotation of the upper platen about the X-axis. In one embodiment, the first gaps and the second gaps of the side flexure assemblies are smaller than the first gaps and the second gaps of the end flexure assemblies.

In two specific embodiments having flexures arranged as shown in FIG. 4, the following dimensions and materials for the flexures used are listed in Table 1.

TABLE 1

| Flexure Dimensions | Example 1 (dimensions in inches) | Example 2 (dimensions in inches) |
|---|---|---|
| Upper Platen Size Length × Width | 17.0 × 17.0 | 30.0 × 18.0 |
| Side Flexure Length × Width (1095 Spring Steel) | 14.5 × 4.0 | 28.0 × 4.0 |
| Side Flexure Gaps | 0.25 | 0.25 |
| Side Flexure Distance Between Upper and Lower Flexures | 0.75 | 0.75 |
| Side Flexure Thickness | 0.01 | 0.008 |
| Side Flexure Stiffener Plate Thickness (6061 aluminum) | 0.125 | 0.25 |
| End Flexure Length × Width (1095 Spring Steel) | 5.75 × 4.0 | 6.0 × 4.0 |
| End Flexure Gaps | 0.25 | 0.35 |
| End Flexure Distance Between Upper and Lower Flexures | 1.5 | 0.75 |
| End Flexure Thickness | 0.01 | 0.008 |
| End Flexure Stiffener Plate Thickness (6061 aluminum) | 0.125 | 0.125 |

The resulting stiffness ratios for Example 1 and Example 2 were calculated by ANSYS finite element modeling and are listed in Table 2:

TABLE 2

| Stiffness Ratios | Example 1 | Example 2 |
|---|---|---|
| kX/kY | 9,801 | 39,186 |
| kZ/kY | 430 | 558 |
| kΦZ/kΦX | 7.7 | 44 |
| kΦY/kΦX | 841 | 12,609 |

In other embodiments of the invention, the upper platen, lower support, and the plurality of flexures can be machined from a monolithic block of material. Alternatively, one or more components can be machined from a block of material and then joined to the other component. For example, the upper platen and some of the flexures can be machined from a first block of material, the lower platen and the remaining flexures can be machined from a second block of material, and then the two assemblies can be connected to each other by suitable fasteners.

In other embodiments of the invention, different physical couplings between the upper platen and the lower support can be used that provide the desired motions and constraints to the upper platen and the micro-contacting stamp. For example, three vertical precision round rods parallel to the Y-axis can be attached to the lower support such that the axes of the rods form the vertices of an equilateral triangle. Three air bushings can be attached to an intermediate member such that the air bushing and intermediate member can translate vertically along the Y-axis on the three vertical rods. A fourth precision round rod parallel to the X-axis can be horizontally attached to the intermediate member. A fourth air bushing aligned with the X-axis and attached to the upper platen can be installed onto the fourth rod. Thus, the three vertical air bushings allow for translation of the upper platen along the Y-axis and the horizontal air bushing allows for rotation of the upper platen about the X-axis while other translations and rotations of the upper platen are constrained. One of skill in the art of mechanical design can provide other physical couplings between the upper platen and lower support having the desired stiffens ratios.

The above embodiments provide "passive stiffness" in that the structural stiffness and resulting calculated stiffness ratios occur due to the size, selection, and arrangement of the mechanical components joining the upper platen to the lower support. In addition to passive stiffness, "active stiffness" can be employed where a combination of position sensors, force sensors, linear actuators, and mechanical components can be used to electronically stiffen the upper platen against rotations or translations about the various axes through the use of force and/or position feedback control.

Figure 5:
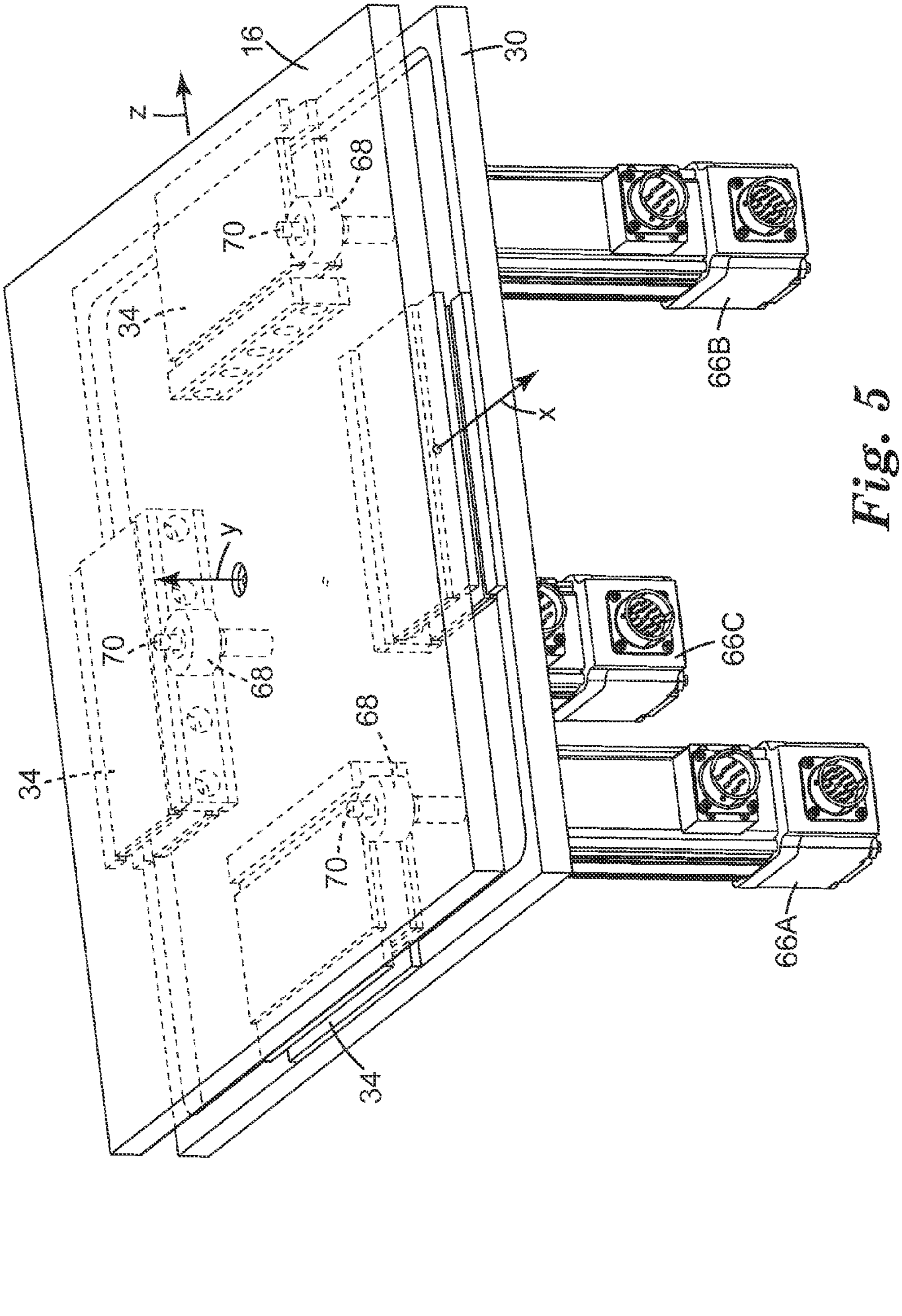
FIG. 5 is a perspective view of another apparatus for applying a micro-contact printing stamp to a roll.

Referring now to FIG. 5, an active stiffness system is illustrated. The upper platen 16 is joined to the lower platen 30 by four flexure assemblies 34 arranged in a generally rectangular configuration and constructed as discussed with regard to the embodiment of FIGS. 1, 3, and 4; however, all of the flexure assemblies have the same length, stiffening plates, first gaps, and second gaps. As a result, the flexure assemblies 34 resist translational motion in the X and Z directions and provide the desired translational stiffness ratios, but do not have sufficient lengths in the X direction to resist rotation about the Z-axis and do not provide the desired rotational stiffness ratios.

Coupled to the upper platen are three displacement linear actuators 66A, 66B, and 66C such as ball screw actuators by Exlar Corporation, Chanhassen, Minn. Each displacement linear actuator has an internal position sensor proportional to the stroke of the actuator providing a position feedback signal to a controller. Between each displacement actuator's output shaft and the upper platen is a force transducer 68 providing force feedback to a controller. For improved accuracy, the force transducer can be attached to the upper platen by a rotational coupler 70, which allows rotations and not translations between the upper platen and the force transducer. A suitable rotational coupler is made by Physik Instrumente Gmbh, having an office in Auburn, Mass. called a P-176.50/60 Flexible Tip.

Two displacement linear actuators, 66A and 66B, are located on either side of the X-axis to one side of the Z-axis and one displacement linear actuator, 66C, is located along the X-axis on the opposite side of the Z-axis from the other two displacement linear actuators. A controller, using both force and position feedback and logic rules, is used to control the displacement of the upper platen along the Y-axis and the allowable rotation of the upper platen about the X-axis. The following equations can be solved simultaneously by the controller using feedback control to achieve the requite motions and rotational stiffness of the upper platen with respect to the lower platen.

1. $-Y<D_A$ and $D_B$ and $D_C<+Y$

Restricts up and down motion along the Y-axis between established upper and lower limits since the minimum and maximum displacement ($D_A$, $D_B$, $D_C$) of all actuators is restrained between the lower and upper limits.

2. $F_A+F_B+F_C$=Constant

Sets the maximum force when the micro-contact printing stamp touches the outer surface of the roll since the sum of the individual forces applied by the actuators ($F_A$, $F_B$, $F_C$) must be a constant. Logic provision for controlling translation of the upper platen along the Y-axis using force feedback.

3. $F_A=F_B$

Allows for rotation about the X-axis since the applied forces must be equal ($F_A=F_B$), but the displacement of each actuator can vary to align the upper platen tangent to the roll's outer surface. Logic provision for allowing (controlling) rotation about the X-axis of the upper platen using force feedback

4. $D_C=(D_A+D_B)/2$

Prevents rotation about the Z-axis since the average displacement of actuators A and B, $(D_A+D_B)/2$, must be equal to the displacement of actuator C ($D_C$). Logic provision for preventing (controlling) rotation about the Z-axis using position feedback.

While not shown, it is understood that the lower platen 30 can be supported by rails parallel to the X-axis with the rails located between the displacement linear actuators such as a first rail between actuators 66A and 66*c* and a second rail between actuators 66C and 66B. Additionally, a suitable base (not shown) is provided to support the rails with clearances for the displacement linear actuators. The lower platen 30 can be attached to the rails by linear bearings attached to the lower platen for translation of the upper and lower platen along the X-axis on the rails.

Thus, the system of linear actuators having both load and displacement feedback and the flexures can be used apply a micro-contact printing stamp to a roll. The controlled motions (linear or rotation) using position or force feedback can be utilized along any of the axes by appropriate choices of the mechanical components, actuators, and their arrangement besides the specific embodiment shown in FIG. 5.

Thus, the invention can reside in a method of applying a micro-contact printing stamp to a roll comprising: supporting the micro-contact printing stamp on an upper platen having an X-axis, a Y-axis, and a Z-axis passing though a centroid of the upper platen with the X-axis and the Z-axis located within the plane of the upper platen and the Z-axis parallel to a rotation axis of the roll; allowing translation of the upper platen along the Y-axis, rotation of the upper platen about the X-axis, and translation of the lower support along the X-axis; providing motion control, resulting from the physical coupling and mechanical actuators chosen connecting the upper platen to the lower support; wherein the upper platen is controlled by at least one of the group consisting of translation along the X-axis using position feedback, translation along the Y-axis using force feedback, translation along the Z-axis using position feedback, rotation about the X-axis using force feedback, rotation about the Y-axis using position feedback, and rotation about the Z-axis using position feedback; elevating the upper platen along the Y-axis to touch the micro-contact printing stamp to the roll; and rotating the roll while translating the lower support along the X-axis to transfer the micro-contact printing stamp to the roll.

In the embodiment shown in FIG. 5, the upper platen is controlled with rotation about the X-axis using force feedback, with rotation about the Z-axis using position feedback, and with translation along the Y-axis using force feedback as discussed in the equations that would be utilized by the controller.

The materials which form which the apparatus are not overly critical. One of skill can readily select them based on the intended loads, maximum allowable deflections, and operating environment. Aluminum is particularly suitable for the upper platen, lower platen, stiffening plates, floating interconnecting members and spacer plates. Spring steel is suitable for the flexures. Stainless steel is suitable for the rails and linear bearings.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An apparatus for applying a micro-contact printing stamp to a roll, the apparatus comprising:

an upper platen supporting the micro-contact printing stamp, a lower support, and a plurality of flexures connecting the upper platen to the lower support, an X-axis, a Y-axis, and a Z-axis passing though a centroid of the upper platen with the X-axis and the Z-axis located within the plane of the upper platen and the Z-axis parallel to a rotation axis of the roll;

an elevating member to translate the upper platen along the Y-axis with respect to the lower support to contact the micro-contact printing stamp with an outer diameter of the roll; and at least one linear motion member located between the lower support and a base allowing translation of the lower support along the X-axis when transferring the micro-contact printing stamp from the upper platen to the roll.

2. The apparatus according to claim 1 wherein the plurality of flexures comprises four flexures forming a generally rectangular configuration with two side flexures each having one end attached to the upper platen parallel to the X axis and two end flexures each having one end attached to the upper platen parallel to the Z-axis.

3. The apparatus according to claim 2 wherein each of the side flexures are longer than each of the end flexures.

4. The apparatus according to claim 1 wherein the plurality of flexures comprises four flexure assemblies forming a generally rectangular configuration; each flexure assembly comprising an upper flexure, a lower flexure, and a floating interconnecting member; a first end of each upper flexure attached to the upper platen and a second end of each upper flexure attached to one of the floating interconnecting members, a first end of each lower flexure attached to the lower support and a second end of each lower flexure attached to one of the floating interconnecting members.

5. The apparatus according to claim 4 wherein two flexure assemblies are positioned with the first end of each upper flexure parallel to the X-axis forming side flexure assemblies and two flexure assemblies are positioned with the first end of each upper flexure parallel to the Z-axis forming end flexure assemblies and wherein the side flexure assemblies are longer than the end flexure assemblies.

6. The apparatus according to claim 4 wherein each upper flexure is generally parallel to each lower flexure prior to elevating the upper platen.

7. The apparatus according to claim 5 wherein each flexure assembly comprises at least one stiffening plate on the upper flexure and at least one stiffening plate on the lower flexure leaving a first gap between the upper platen and the stiffening plate on the upper flexure and a first gap between the lower support and the stiffening plate on the lower flexure; and a second gap between the floating interconnecting member and each of the stiffening plates on the upper and lower flexures, and wherein the first gaps and the second gaps of the side flexure assemblies are smaller than the first gaps and the second gaps of the end flexure assemblies.

8. The apparatus according to claim 1 wherein the lower support comprises a lower platen and the at least one linear motion member comprises two rails mounted on the base with each rail parallel to the X-axis and a plurality of linear bearings attached to the lower platen and positioned on the rails.

9. The apparatus according to claim 8 wherein a spacer block is positioned between the lower platen and the plurality of linear bearings.

10. The apparatus according to claim 1 wherein a linear motion actuator is connected to the lower support.

11. The apparatus according to claim 10 wherein the linear motion actuator comprises a linear servo motor with a stator connected to the base and an armature connected to the lower support.

12. A method of applying a micro-contact printing stamp to a roll comprising:

supporting the micro-contact printing stamp on an upper platen having an X-axis, a Y-axis, and a Z-axis passing though a centroid of the upper platen with the X-axis and the Z-axis located within the plane of the upper platen and the Z-axis parallel to a rotation axis of the roll;

allowing translation of the upper platen along the Y-axis, rotation of the upper platen about the X-axis, and translation of the lower support along the X-axis;

providing stiffness ratios, resulting from the physical coupling chosen between the upper platen and the lower support, such that kX/kY and kZ/kY are both greater than 3 and kΦZ/kΦX and kΦY/kΦX are both greater than 3;

elevating the upper platen along the Y-axis to touch the micro-contact printing stamp to the roll; and rotating the roll while translating the lower support along the X-axis to transfer the micro-contact printing stamp to the roll.

13. The method according to claim 12 wherein rotating the roll comprises using a drive connected to the roll.

14. The method according to claim 12 wherein translating the lower support comprises using a linear actuator.

15. The method according to claim 14 wherein the linear actuator comprises a linear servo motor.

16. The method according to claim 12 wherein kX/kY and kZ/kY are both greater than 10 and kΦZ/kΦX and kΦY/kΦX are both greater than 10.

17. The method according to claim 12 wherein kX/kY and kZ/kY are both greater than 100 and kΦY/kΦX is greater than 100.

18. The method according to claim 12 wherein kX/kY is greater than 10,000, kZ/kY is greater than 100, and kΦY/kΦX is greater than 10,000.

19. A method of applying a micro-contact printing stamp to a roll comprising:

supporting the micro-contact printing stamp on an upper platen having an X-axis, a Y-axis, and a Z-axis passing though a centroid of the upper platen with the X-axis and the Z-axis located within the plane of the upper platen and the Z-axis parallel to a rotation axis of the roll;

allowing translation of the upper platen along the Y-axis, rotation of the upper platen about the X-axis, and translation of the lower support along the X-axis;

providing motion control, resulting from the physical coupling and mechanical actuators chosen connecting the upper platen to the lower support;

wherein the upper platen is controlled by at least one of the group consisting of translation along the X-axis using position feedback, translation along the Y-axis using force feedback, translation along the Z-axis using position feedback, rotation about the X-axis using force feedback, rotation about the Y-axis using position feedback, and rotation about the Z-axis using position feedback;

elevating the upper platen along the Y-axis to touch the micro-contact printing stamp to the roll; and rotating the roll while translating the lower support along the X-axis to transfer the micro-contact printing stamp to the roll.

20. The method according to claim 19 wherein the upper platen is attached to the lower support by a plurality of flexures and three displacement linear actuators are attached to the upper platen; each displacement linear actuator having a position sensor and a load cell is located between the displacement linear actuator and the upper platen.

21. The method of claim 19 wherein the upper platen is controlled with rotation about the X-axis using force feedback, with rotation about the Z-axis using position feedback, and with translation along the Y-axis using force feedback.

* * * * *

UNITED STATES PATENT AND TRADEMARK OFFICE

CERTIFICATE OF CORRECTION

PATENT NO. : 8,911,582 B2
APPLICATION NO. : 14/241452
DATED : December 16, 2014
INVENTOR(S) : Karl Stensvad et al.

It is certified that error appears in the above-identified patent and that said Letters Patent is hereby corrected as shown below:

In the Specification,

Column 2,
Line 6, delete "though" and insert -- through --, therefor.
Line 19, delete "though" and insert -- through --, therefor.
Line 39, delete "though" and insert -- through --, therefor.

Column 10,
Line 2, delete "feedback" and insert -- feedback. --, therefor.
Line 29, delete "though" and insert -- through --, therefor.

In the Claims,

Column 11,
Line 18, in Claim 1, delete "though" and insert -- through --, therefor.

Column 12,
Line 21, in Claim 12, delete "though" and insert -- through --, therefor.
Line 56, in Claim 19, delete "though" and insert -- through --, therefor.

Signed and Sealed this
Twelfth Day of May, 2015

Michelle K. Lee

Michelle K. Lee
*Director of the United States Patent and Trademark Office*